United States Patent [19]
Kaplan

[11] Patent Number: 5,774,278
[45] Date of Patent: Jun. 30, 1998

[54] SPECTRAL FILTER

[75] Inventor: Martin Charles Kaplan, Rochester, N.Y.

[73] Assignee: Eastman Kodak Company, Rochester, N.Y.

[21] Appl. No.: 565,327

[22] Filed: Nov. 30, 1995

[51] Int. Cl.$^6$ ................................................. G02B 3/00
[52] U.S. Cl. ..................... 359/723; 359/599; 359/641; 359/707; 359/885
[58] Field of Search .................. 359/723, 599, 359/614, 885, 641, 707

[56] References Cited

U.S. PATENT DOCUMENTS

| | | | |
|---|---|---|---|
| 3,761,184 | 9/1973 | McLaughlin, Jr. ...................... | 356/186 |
| 4,013,348 | 3/1977 | Yamada ................................... | 350/196 |
| 4,225,782 | 9/1980 | Kuppenheimer, Jr. et al. ........ | 250/216 |
| 4,454,535 | 6/1984 | Machida ................................. | 358/60 |
| 4,481,414 | 11/1984 | Gasper .................................. | 250/226 |
| 4,482,218 | 11/1984 | Tanaka ................................. | 350/427 |
| 4,534,614 | 8/1985 | Silverglate ............................. | 350/1.4 |
| 4,832,426 | 5/1989 | Kaser .................................... | 350/3.72 |
| 4,892,397 | 1/1990 | Horiuchi ............................... | 350/425 |
| 5,024,530 | 6/1991 | Mende .................................. | 356/402 |
| 5,026,145 | 6/1991 | Marui et al. .......................... | 350/351 |
| 5,029,010 | 7/1991 | Shiraishi .............................. | 358/225 |
| 5,124,859 | 6/1992 | Martin et al. ......................... | 359/886 |
| 5,214,494 | 5/1993 | Inaba et al. ........................... | 356/419 |
| 5,262,880 | 11/1993 | Abileah ................................. | 359/40 |
| 5,594,830 | 1/1997 | Winston et al. ...................... | 385/129 |
| 5,629,764 | 5/1997 | Bahuguna et al. ................... | 356/71 |

*Primary Examiner*—Georgia Y. Epps
*Assistant Examiner*—Jordan M. Schwartz
*Attorney, Agent, or Firm*—Gordon M. Stewart

[57] ABSTRACT

A spectral filtration system comprising a non-imaging optic having entry and exit faces, the exit face being tilted relative to the entry face, and a filter positioned so as to receive light from, or transmit light to, a face of the non-imaging optic.

27 Claims, 3 Drawing Sheets

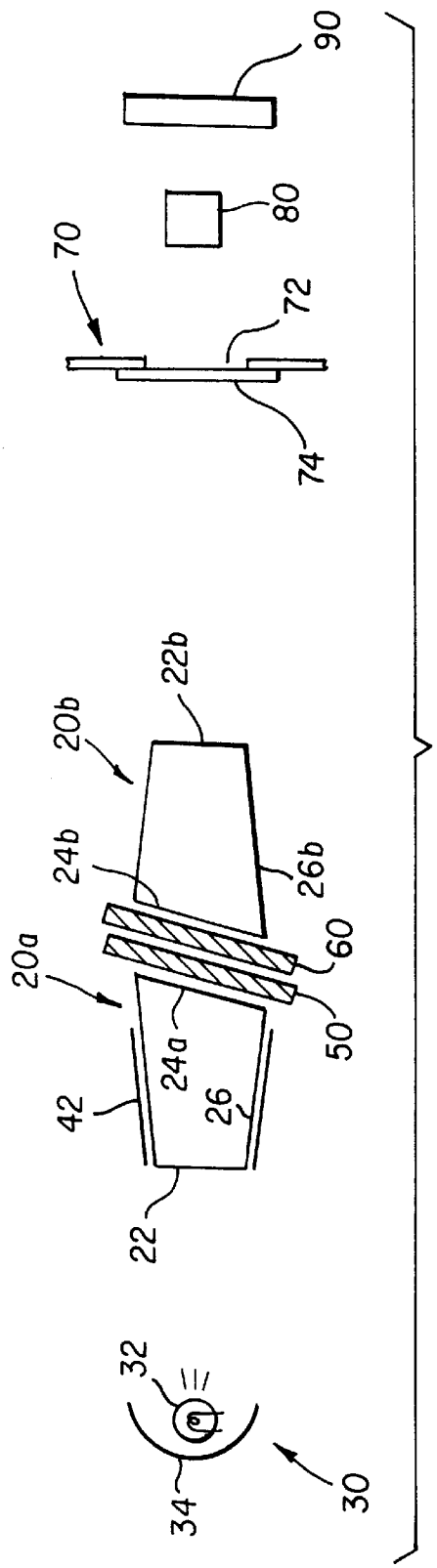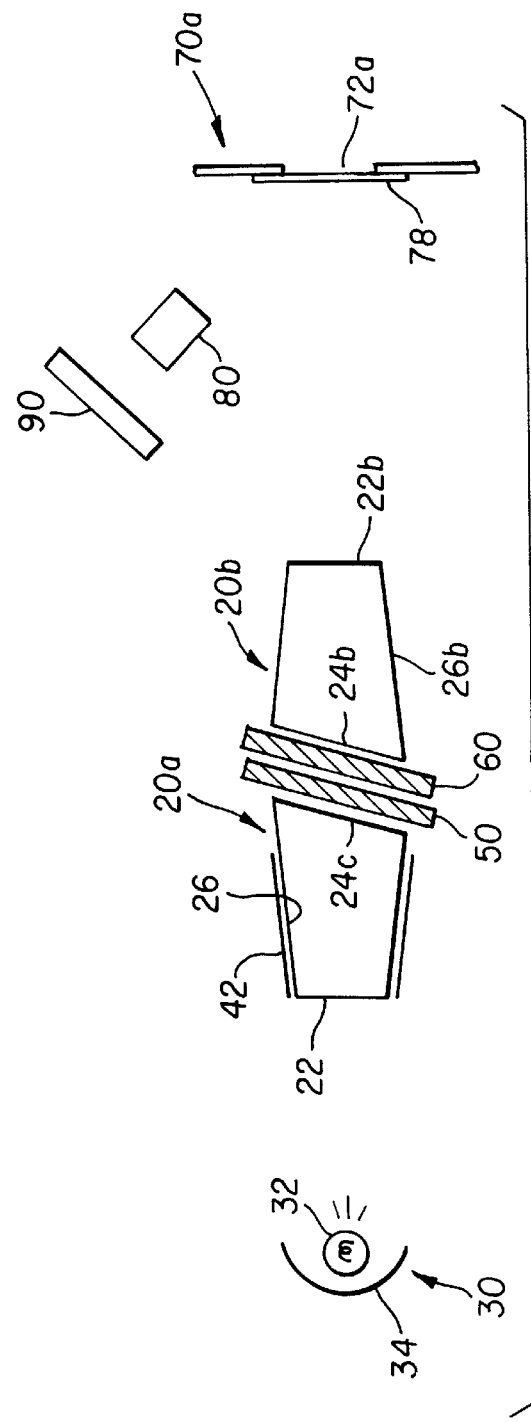
FIG. 4
FIG. 5

SPECTRAL FILTER

FIELD OF THE INVENTION

The invention relates generally to the field of optics, and in particular to scanners which convert hard copy images into data.

BACKGROUND OF THE INVENTION

In many technology areas it is necessary to filter light from a light source before being used for a particular application. This is particularly true in the area of scanners. Scanners convert hard copy analog images into digital data. The use of scanners has become widespread for a variety of applications, including storing, manipulating, transmitting and displaying or printing copies of the images. For example, images captured in photographic media are being converted to digital data and stored on compact discs for readout and display as a video image or for printing with various types of color printers. In order to capture the photographic image digitally, the image frame is scanned with a light beam or line emanating from a light source through a suitable filter, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in commonly assigned U.S. Pat. No. 5,012,346.

Spectral filtration in many technology areas can be accomplished by a variety of means. Two of the most common are multilayer dielectric interference coating (often called dichroic) filters, and absorptive filters. Dichroic filters alter the spectrum of light by selectively transmitting or reflecting (or partially transmitting and partially reflecting) different wavelengths of light differently. The selectivity is accomplished by choosing appropriate thicknesses and indices of refraction for a series of thin layers deposited on top of each other, designed to cause appropriate optical interference effects. Typically the layers are 100–200 nm thick and alternate between higher and lower indices of refraction. It is well known that changing the angle at which light impinges on such filters alters the wavelengths which are transmitted and reflected, thereby changing the spectral transmission characteristics of the filter. Consequently, such filters are generally designed for light incident at a particular angle, most commonly 0° and 45°.

Absorptive filters generally consist of a volume of a material (such as glass or gelatin, often impregnated with dyes) which contains atoms or molecules that absorb different wavelengths of light unequally. Often such filters are flat plates, made of such materials or coated with such materials. Such filters are generally used to filter light at 0° incidence (normal incidence). Light impinging at higher angles will have a greater path length through the material, and will consequently be more strongly absorbed. Thus, absorptive filters also change their spectral transmission characteristics depending on the angle of incidence of the light.

Diffuse light (either fully diffuse or partially diffuse), which is light traveling over a wide range of angles, is difficult to precisely filter spectrally with either dichroic or absorptive filters. This is because it will impinge on the filter at a variety of angles. This causes different filtration for light at each angle, spectrally smearing the filtration.

Electric lamps often emit angularly diffuse light, which must be precisely filtered for use in a scanner. Failure to provide precise spectral filtration in such an application can lead to undesirable color shifts in the digitized image (i.e. the correct colors of the scanned image are distorted).

Filtration devices have been known using dichroic or absorptive filters positioned between tapered cones. Such types of devices are disclosed in U.S. Pat. No. 4,481,414, U.S. Pat. No. 3,761,184 and U.S. Pat. No. 4,225,782. However, none of those devices utilize non-imaging optics with non-parallel exit and entry faces. Additionally, none of those devices are used as a filter which still allows passage of large amounts of visible light in the red, green and blue regions of the spectrum. Further, none of these devices describe a scanner in which light filtered through a cone arrangement then impinges upon a medium to be scanned.

It would be desirable then, to have a spectral filtration system which permits the use of conventional filters such as dichroic and absorptive filters, but reduces or eliminates the spectral blurring effects which normally occur when such conventional filters are applied to a diffuse beam of light. It would be further desirable that such a spectral filtration system can still provide an output of diffuse light for applications such as a scanner.

SUMMARY OF THE INVENTION

The present invention provides a spectral filtration system, comprising:

a) a non-imaging optic having entry and exit faces, the exit face not being parallel to the entry face; and b) a filter positioned so as to receive light from, or transmit light to, a face of the non-imaging optic.

In one embodiment of the present invention, a spectral filtrations system is provided with a collimating optic having entry and exit faces, and a diffusing optic having entry and exit faces with the entry face positioned to receive light from the exit face of the collimating optic. Additionally, a filter is positioned between the exit face of the collimating optic and entry face of the diffusing optic. In this emobodiment, at least one of the collimating and diffusing optics is a non-imaging optic with one face not parallel to the other.

The present invention further provides, in a second aspect a spectral filtration system using a collimator, a diffuser and a filter therebetween, which filtration system passes light in the wavelength ranges 350–500 nm, 500–600 nm and 600–800 nm, with ratios of attenuations at the wavelength in each range which is least attenuated all being between 1/20 to 20/1. A scanner is further provided which has: a light source; a spectral filtration system with a collimator, diffuser and filter therebetween, which receives and passes light from the light source; a media holder to position an image bearing medium to be scanned, so as to receive light from the diffuser; and a detector positioned to receive light from the medium being scanned. An illumination system, such as described below, which can use any of the spectral filtration systems described herein, is also provided.

A spectral filtration system of the present invention permits the use of conventional filters such as dichroic and absorptive filters to filter light from a diffuse light source, but produces no or low spectral blurring effects which normally occur when such conventional filters are applied to a diffuse beam of light. A spectral filtration system of the present invention can be useful in an application where it is desired to obtain spectral filtration without changing diffuseness characteristics. Further, the system can provide a diffuse source of light which aids in scratch suppression in scanning an image (i.e. the visibility to the detector of scratches in the image being scanned, is reduced).

BRIEF DESCRIPTION OF THE DRAWINGS

FIG. 4 is a schematic representation of a scanner of the present invention using a spectral filtering system of the present invention;

FIG. 5 is a view similar to FIG. 4 but showing another embodiment of a scanner of the present invention;

To facilitate understanding, identical reference numerals have been used, where possible, to designate identical elements that are common to the figures.

DETAILED DESCRIPTION OF THE INVENTION

Figure 1:
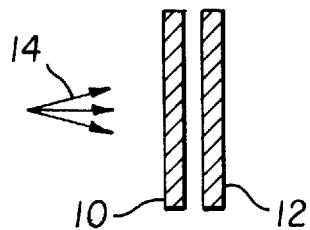
FIG. 1 is a cross-sectional view of a typical prior art light filtration system.

In the present application, reference to a "non-imaging optic" means a device for transmitting light and which can alter the degree of collimation of a light beam passing through it by at least one (and possibly multiple) internal refection. An internal reflection is reflection of a light beam which is inside a body, from a surface of the body back into the inside of the body. For example, a reflection off a mirrored internal surface of a hollow cone, or total internal refection of a light ray inside a transparent solid from the surface of the solid (the surface being an interface with another medium, such as air). Non-imaging optics may be of many types, and are described in the book High Collection Nonimaging Optics, by W. T. Welford and R. Winston, Academic Press, New York, 1989. By light or visible light, is referenced light which is visible to the human eye, and typically falls between 350–800 nm (although it may be limited to 400–700 nm as human eye sensitivity falls off rapidly outside this region).

In the spectral filtration system of the present invention, the exit face of the diffusing non-imaging optic is preferably smaller in area than the entry face of the diffusing non-imaging optic, and both are preferably, but not necessarily, planar. Similarly, the exit face of the collimating non-imaging optic may be larger in area than the entry face of the collimating non-imaging optic, and both are preferably, but not necessarily, planar. Additionally, the entry face of the diffusing non-imaging optic may be selected not to be parallel to the diffuser exit face, and is preferably parallel to the exit face of the collimating non-imaging optic. In this latter situation, it is preferred that the filter is planar and also parallel to the entry face of the diffusing non-imaging optic and the exit face of the collimating imaging optic, since then a compact arrangement of the elements of the filtration system is obtained.

As to the shape of the collimating and diffusing non-imaging optics, either or preferably both, has the shape of a section of a rotationally symmetric form. For example, the shape of a cone may be used with the peak cut orthogonal to the rotational axis and the base cut at a non-orthogonal angle to the rotational axis. In the case of the collimating non-imaging optic then, the entry face would then be orthogonal to the rotational axis and the larger area exit face at a non-orthogonal angle thereto, while in the case of the diffusing non-imaging optic this would be reversed (that is, the entry face, which receives light passing through the filter, would be at an angle to the rotational axis of the cone section while the smaller exit face would be orthogonal thereto). It will be appreciated that in any event, the rotational axis of the diffusing non-imaging optic is parallel (but not necessarily co-linear) with the rotational axis of the collimating non-imaging optic.

The diffusing non-imaging optic is preferably of the same shape (this includes dimensions) and material as the collimating non-imaging optic.

In the second aspect of the spectral filtration system described above, it will be appreciated that any collimator or diffuser will be sufficient, and it is not necessary that either or both be non-imaging optics (although they preferably are non-imaging optics of the types described already). Further, the ratios of attenuations at the wavelength in each range which is least attenuated are preferably all between 1/10 to 10/1, and in some cases these could more restrictively limited to 1/7 to 7/1. Also, any of the described ratio ranges of attenuations at the wavelength in each range which is least attenuated, could be measured in each of three wavelength ranges of 400–500 nm, 500–600 nm and 600–700 nm.

This second aspect may include an electrically powered light source positioned to provide light to the entry face of the collimator. Such a light source is preferably polychromatic (this would exclude, for example, monochromatic laser light). For example, the light source and filtration system could be chosen to provide output light, which light in each of the wavelength ranges of 350–500 nm, 500–600 nm and 600–800 nm has an integrated power, measured in watts, such that all the ratios of the integrated powers are between 1/20 to 20/1 (preferably 1/5 to 5/1). optionally, the light source could be selected to have the same range of ratios of integrated power measured in the wavelength ranges 400–500 nm, 500–600 nm and 600–700 nm.

An illumination system is further provided in the present invention which has: a light source; a spectral filtration system having a collimator, filter and diffuser of any of the types described herein; wherein the light source and filtration system provide light from the diffuser, which light in each of the wavelength ranges of 350–500 nm, 500–600 nm and 600–800 nm has an integrated power, measured in watts, such that all the ratios of the integrated powers are between 1/20 to 20/1.

In the scanner of the present invention, it will be appreciated that any collimator or diffuser will be sufficient, and it is not necessary that either or both be non-imaging optics (although they preferably are non-imaging optics of the types described already). The spectral filtration system may be any of those described above, and may meet the requirements of either or both of the first and second aspects of the filtration system described above. Further, the media holder and detector may be arranged for different media. For example, they may be arranged for scanning a transparent media, such as a photographic negative, in which case the detector would be positioned to be on a side opposite the side of media holder from the direction in which the light from the light source and spectral filtration system reaches the media holder (so that light passes through the transparent media to the detector). Alternatively, they could be arranged for scanning a reflective medium such as a photographic print (which has a paper base). In this case, the detector would be positioned to be on the same side of the media holder from the direction in which the light reaches the media holder (so that light from the light source and spectral filtration system, which is reflected off the media, is captured by the detector).

Referring first to FIG. 1, this shows a typical prior art spectral filtration arrangement. This arrangement uses a dichroic filter 10 and an absorptive filter 12, to spectrally filter diffuse light 14. Because diffuse light travels over a range of directions, as illustrated, the filters affect different parts of the light differently, spectrally blurring the filtration effects.

Figure 2:
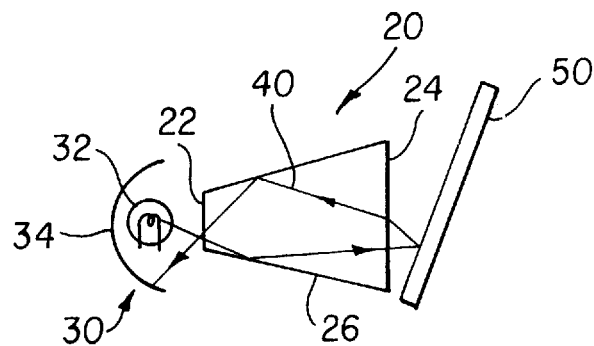
FIG. 2 is a cross-sectional view of a collimating non-imaging optic with parallel entry and exit faces, illustrating the path of a light ray.

FIG. 2 illustrates the operation of a collimating non-imaging optic filtration system. In particular, light from a light source 30 (in particular an ANSI designated ELC tungsten-halogen projector lamp), which includes an electric bulb 32 and reflector 34, enters an entry face 22 of a collimating non-imaging optic 20. Collimating non-imaging optic 20 is a solid dielectric in the shape of a section of a cone, with planar, parallel entry face 22 and exit face 24, as well as a side wall 26. The arrows show the path of a typical light ray 40 from light source 30, which is rejected by the filtration system. The light ray 40 leaves source 30, enters entry face 22, internally reflects off side wall 26 and travels toward a planar dichroic filter 50. Dichroic filters function by reflecting unwanted wavelengths of light.

Filter 50 is positioned at an angle which is not orthogonal to the rotational axis of symmetry of the cone from which collimating non-imaging optic 20 is cut. Ray 40 is then reflected by filter 50 back into the collimating non-imaging optic 20. It then again internally reflects off wall 26, and returns to light source 30. Light source 30 (specifically reflector 34 thereof) in turn reflects the ray 40 back into the collimator a second time (not shown), and back to the filter. Since some undesirable light will leak through filter 50 each time, multiple returns of light ray 40 to the filter decrease the total rejection capability of the filter.

Preferably, in the present invention, solid non-imaging optics are used, to provide a better escape path for the unwanted light. In a less preferred design using hollow non-imaging optics, such as a hollow non-imaging internally reflecting cone section for the collimating non-imaging optic, some of the light rejected by the dichroic filter will be reflected back into the collimating first non-imaging optic, and be reflected once again toward the dichroic mirror As in the arrangement shown in FIG. 2, this again increases the leakage of unwanted wavelengths through the dichroic mirror.

Furthermore, a limitation of the design shown in FIG. 2 is that tilting the dichroic mirror 50 increases the gap between collimating non-imaging optic 20 and any diffuser, such as a diffusing non-imaging optic placed on the opposite side of filter 50 to receive light therefrom. This decreases optical efficiency because the light between the non-imaging optics is less than perfectly collimated, and therefore the light beam will spread and some portion of it will fail to be collected by the diffusing non-imaging optic. Increasing the size of the entry face of the diffusing non-imaging optic does not solve this problem, because the optical principle of the Lagrange invariant requires that a penalty be paid in some way in the final output beam, either by increasing the beam diameter, increasing the beam divergence (diffuseness), losing some of the light (inefficiency), or some combination of the three.

Figure 3:
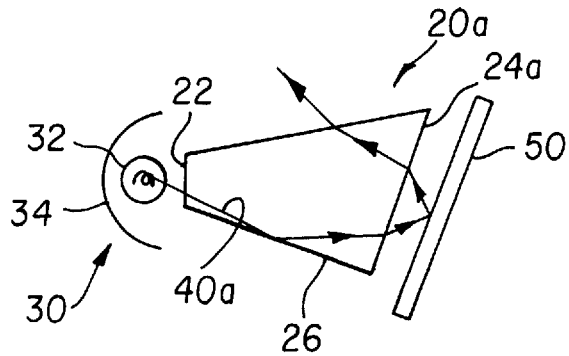
FIG. 3 is a view similar to FIG. 2 but with a collimating non-imaging optic having non-parallel light entry and exit faces.

FIG. 3 shows an improved spectral filtration system of the present invention. The system of FIG. 3 is essentially the same as that of FIG. 2. However, the collimating non-imaging optic 20a is modified from the collimating non-imaging optic of FIG. 2. In particular, non-imaging optic 20a is still of the shape of a section of a cone, but with its exit face 24a at an angle which is not orthogonal to the axis of the cone from which optic 20a is cut. Thus, exit face 24a is not parallel to entry face 22. In this case ray 40a proceeds to filter 50. However, refraction at exit face 24a increases the angle at which the nominal light ray 40a strikes filter 50, in turn increasing the angle with respect to the axis at which ray 40a re-enters optic 20a. This causes collimating non-imaging optic 20a to reject the ray through side wall 26, rather than back toward light source 30. Ray 40a can then be intercepted by a light absorbing baffle, or permitted to wander harmlessly away.

It will be appreciated that when a filter 50 is tilted, such as shown in FIG. 3, a thinner filter is required than for the same filter oriented orthogonal to the axis of rotation of the cone from which optic 20a is a section, in order to obtain the same amount of absorption. That is, thinning a tilted absorptive filter will make the optical path length through the tilted filter the same as the path length through an un-tilted absortive filter. The faces of non-imaging optics adjacent to the filters are also tilted to match the filters, such as in FIGS. 4 and 5 below. Tilting the faces of the non-imaging optics not only permits a smaller gap between the non-imaging optics, but it also permits the use of smaller tilts, because of the refractive effect of the tilted faces.

Thus, it will be seen that in the present inventive filtration system, positioning exit face 24a so that it is not parallel to entry face 22, can be advantageous.

FIGS. 4 and 5 illustrate a spectral filtration system of the present invention as used in a scanner of the present invention. The spectral filtration system has a collimating non-imaging optic 20a and a dichroic filter 50, both arranged and being the same as described in connection with FIG. 3. The filtration system also has an absorptive filter 60 and a diffusing non-imaging optic 20b. Absorptive filter 60 is positioned adjacent and parallel to dichroic filter 50. Non-imaging optic 20b is identical in material and dimensions to collimating non-imaging optic 20a, but the larger face 24b is the entry face positioned to receive light passing through filters 50, 60, and the smaller face 22b is the exit face, with a side wall 26b therebetween. It will be noted that in practice there is little or no gap between exit face 24a, filters 50, 60 and entry face 24b. This leads to a very compact filtration system. Further, such a compact system is efficient since little light will stray from between exit face 24a and entry face 24b (which light could interfere with other components in the scanner or other apparatus in which the filtration system is used).

The scanner of FIG. 4 also includes a light source 30, as already described. A media holder 70 is provided which positions and retains an image bearing medium, such as photographic film 74, to be scanned, so as to receive light from the exit face 22b of diffusing non-imaging optic 20b. Media holder 70 has an aperture opening 72. Preferably an integrating cavity (not shown) is provided so that light from exit face 22b of diffusing non-imaging optic 20b enters the integrating cavity, then passes out from the integrating cavity toward medium 74. A preferred integrating cavity is an integrating cylinder as described, for example, in U.S. Pat. No. 5,335,158 or U.S. Pat. No. 5,274,228. A lens 80 is positioned between media holder 70 and a detector 90 so that the illuminated medium 74 will be focused on detector 90. Detector 90 may be any suitable detector such as one or more charge coupled devices ("CCDs"), for example a tri-linear CCD assembly and associated filters, or a 2-dimensional array CCD.

In operation of the scanner of FIG. 4, diffuse light from light source 30 is collimated by collimating non-imaging optic 20*a*. A light absorbing baffle 42 surrounds, and is adjacent to, side wall 26 and is made of a black light absorbing material. Baffle 42 absorbs any light exiting side wall 26 of optic 20*a* (such as ray 40*a* shown in FIG. 3) so that it does not interfere with other components (such as detector 90) in the scanner. The more collimated light leaving exit face 24*a* of optic 20*a* is then filtered by dichroic and absorbing filters 50 and 60 respectively. Because the light has been collimated before entering filters 50, 60 spectral blurring is reduced over what otherwise would occur without collimating the light from source 30. The collimated and filtered light then enters entry face 24*b* of diffusing non-imaging optic 20*b* and is diffused by it before passing out exit face 22*b* and into an integrating cavity (not shown). Optic 22*b* reduces the size of the light beam from that passing through filters 50, 60 and also restores the original diffusivity of the light from source 30. Reducing the size of the light beam makes the integrating cavity more efficient since a smaller entry hole can be used in the integrating cavity which reduces the amount of light which will leak back out the entry hole. Increased diffuseness also improves the uniformity of the integrating cavity output.

It will also be appreciated that a spectral filtration system such as that shown as part of the scanner in FIG. 4, spectrally filters light without altering its diffuse character. Thus, such a spectral filtration system can be useful in any application (scanner or some other application) where it is desired to obtain spectral filtration without changing diffuseness characteristics.

The filtered, diffused and integrated light, then passes through media 74 and lens 80 onto detector 90. The signals from detector 90 are then digitized and stored as a digital representation of the image on media 74, using suitable digitizing circuits, a processor and storage medium (not shown).

The scanner shown in FIG. 5 is identical to that shown in FIG. 4, except the lens 80 and detector 90 have been moved for scanning a reflecting medium 78. Thus, lens 80 and detector 90 capture light reflected off medium 78. Media holder 70*a* need no longer have an aperture 72*a* for such an application but may have if it is also desired to be able to scan a transparent medium (in which case a lens and detector arrangement of FIG. 4 would have to be present or the lens 80 and detector 90 in FIG. 5 could be moved or some arrangement of mirrors used).

Figure 6:
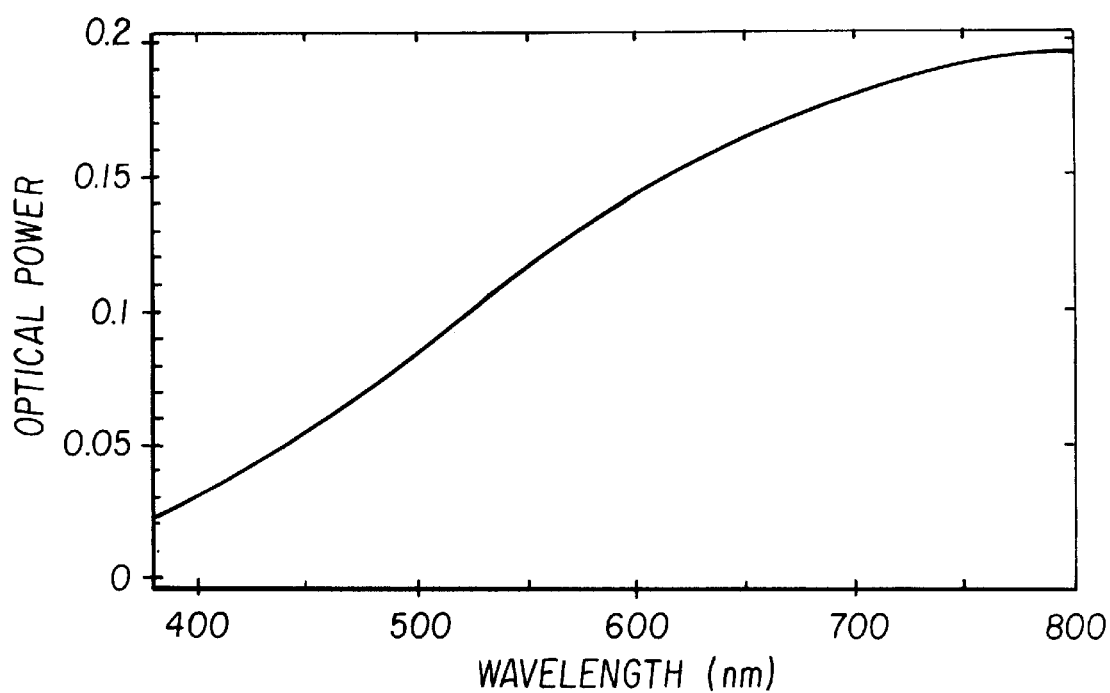
FIG. 6 is a plot of optical power versus wavelength for a light source used in a scanner of the present invention.
Figure 7:
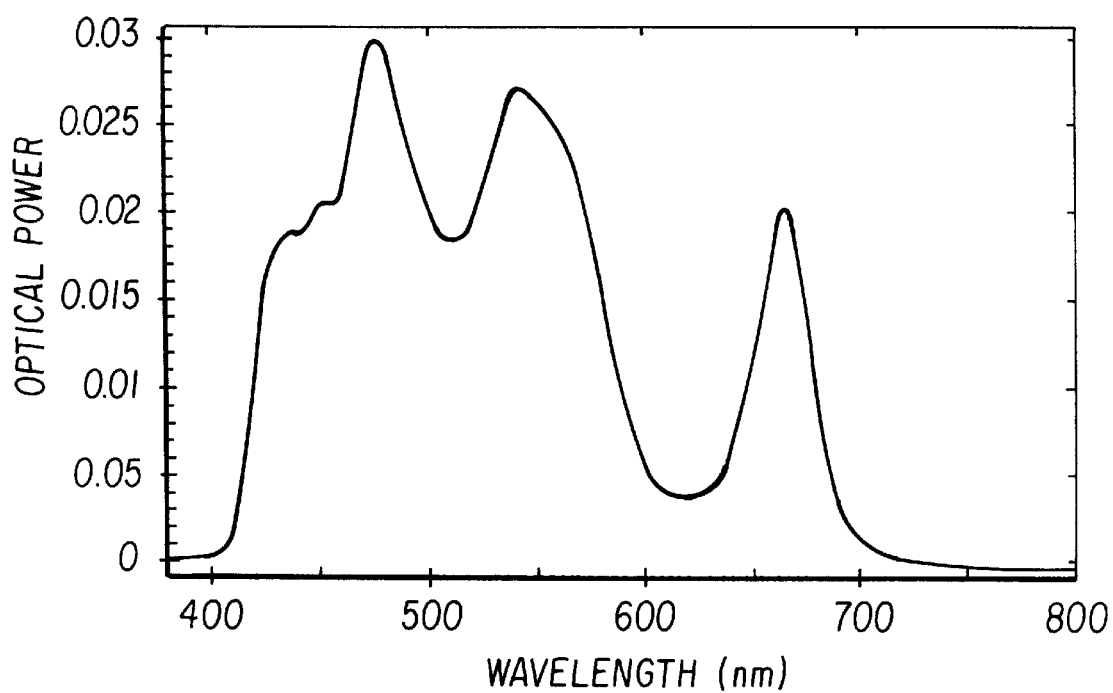
FIG. 7 is a plot similar to that of FIG. 6 showing the optical power of light from the light source plotted in FIG. 4, after it has been filtered by a spectral filtration system of the present invention.

A typical output spectrum of a light source 30 is shown in FIG. 6. The filters 50 and 60 are preferably selected to filter light of the spectral characteristics in FIG. 6, so that light leaving exit face 22*b* of the diffusing non-imaging optic 20*b*, has the spectral characteristics shown in FIG. 7.

Figure 8:
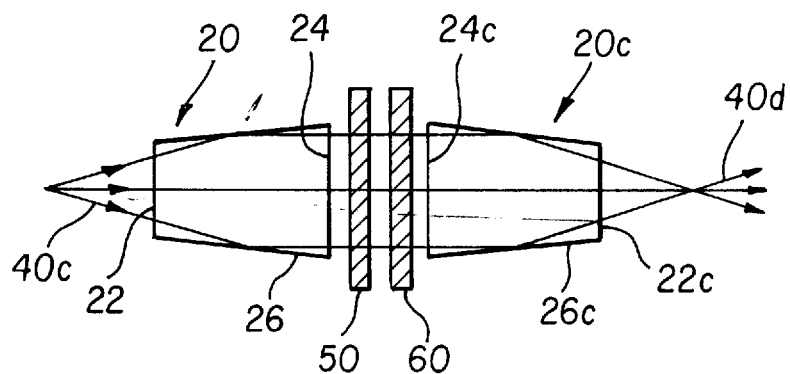
FIG. 8 is a cross-section of an optical filtration system of a second aspect of the present invention.

In the second aspect of the spectral filtration system of the present invention, and in the scanner of the present invention, it is preferred to use collimating non-imaging optic 20*a* and diffusing non-imaging optic 20*b*, each having faces 24*a* and 24*b*, respectively, as shown in FIGS. 4 and 5. However, this is not necessary. In either of such system or scanner, it is possible to use a spectral filtration system as shown in FIG. 8. The filtration system of FIG. 8 is similar to that in FIGS. 4 and 5, except the collimating non-imaging optic is optic 20 as already described in connection with FIG. 2, and diffusing non-imaging optic 20*c* is identical in dimensions and material to optic 20 and both optics 20 and 20*c* have their axes of rotation aligned (that is, co-linear). Diffusing non-imaging optic 20*c* is arranged with its larger area face 24*c* being its entry face and smaller area face 22*c* being its exit face (and side wall 26*c* extending therebetween). Diffuse light rays 40*c* illustrate how light from a light source such as light source 30 (not shown in FIG. 8), is collimated by optic 20, then filtered by filters 50, 60 and then diffused by optic 20*c* into diffuse light rays 40*d*. While a gap has been shown between face 24, filter 50, filter 60 and face 24*c*, for clarity, all of these components would preferably abut each other in the order shown.

It will also be appreciated that in the second aspect of the present invention, and in the scanner of the present invention, any other type of diffuser or collimator could be used, and it is not essential that they be non-imaging optics. However, the arrangement of FIGS. 4 and 5 is preferred.

Alternative embodiments include other types of non-imaging optics, such as different shapes (for example, Compound Parabolic Concentrators, as described in the text High Collection Nonimaging Optics, mentioned above) and different materials (for example, other glasses, or hollow cones with mirrored inner surfaces). Further, in the embodiments not requiring nonimaging optics, discussed above, alternative embodiments include using imaging optics, such as lenses (both refractive and reflective), rather than non-imaging optics, although generally the non-imaging optic designs will be more efficient optically. Also, it is possible to use un-matched collimating and diffusing optics (unlike the identical cone sections above), in which case the output light beam will have a different size and diffusivity than the input beam, or else there will be increased light losses. The faces of the optics (and filters) may be treated to reduce reflection losses, such as anti-reflection coatings or diffractive (binary) optic surface treatments.

Although spectral filtration systems of the present invention, have generally been described above with reference to light from a source passing first through a collimating non-imaging optic or collimator, then through a filter, it will be appreciated that any of these systems can operate in reverse. For example, in a simple case where the spectral filtration system has only a single non-imaging optic and a filter, light may pass from a source first through the filter and then be transmitted to the non-imaging optic.

The invention has been described with reference to embodiments described in detail above. However, it will be appreciated that variations and modifications can be effected by a person of ordinary skill in the art without departing from the scope of the invention.

I claim:
1. A spectral filtration system, comprising:
    a) a collimating non-imaging optic having entry and exit faces, the exit face being tilted relative to the entry face; and
    b) a spectral filter positioned so as to receive light from, or transmit light to, a face of the non-imaging optic, and wherein the non-imaging optic alters the degree of collimation of a light beam passing through it by at least one internal reflection.
2. A spectral filtration system, comprising:
    a) a collimating optic having entry and exit faces;

b) a diffusing optic having entry and exit faces with the entry face positioned to receive light from the exit face of the collimating optic; and c) a spectral filter positioned between the exit face of the collimating optic and entry face of the diffusing optic;

wherein at least one of the collimating and diffusing optics is a non-imaging optic with one face being tilted relative to the other and wherein the non-imaging optic alters the degree of collimation of a light beam passing through it by at least one internal reflection.

3. A filtration system according to claim 2 wherein one of the faces of the non-imaging optic is smaller in area than the other face.

4. A filtration system according to claim 2 wherein the collimating and diffusing optics are both non-imaging optics and the entry and exit faces of each are planar.

5. A filtration system according to claim 3 wherein the non-imaging optic has the shape of a section of a rotationally symmetric form.

6. A filtration system according to claim 2 wherein both of the collimating optic and diffusing optic are non-imaging optics, and wherein the diffusing non-imaging optic is the same shape and material as the collimating non-imaging optic.

7. A filtration system according to claim 3 wherein the entry and exit faces of the non-imaging optic are both planar.

8. A spectral filtration system comprising:

a) a collimating optic having entry and exit faces;

b) a diffusing optic having entry and exit faces with the entry face positioned to receive light from the exit face of the collimating optic; and c) a filter positioned between the exit face of the collimating optic and entry face of the diffusing optic;

wherein the collimating and diffusing optics are both non-imaging optics and the entry and exit faces of each are all planar; and wherein the entry and exit faces of the collimating non-imaging optic are not parallel, and the entry and exit faces of the diffusing non-imaging optic are not parallel and wherein the non-imaging optics alter the degree of collimation of a light beam passing through them by at least one internal reflection.

9. A filtration system according to claim 8 wherein the entry face of the diffusing non-imaging optic is parallel to the exit face of the collimating non-imaging optic.

10. A filtration system according to claim 9 wherein the filter is parallel to the entry face of the diffusing non-imaging optic and the exit face of the collimating non-imaging optic.

11. A filtration system according to claim 9 wherein the collimating non-imaging optic has the shape of a section of a rotationally symmetric form, and the entry face is orthogonal to the rotational axis.

12. A filtration system according to claim 11 wherein the diffusing non-imaging optic has the shape of a section of a rotationally symmetric form, the rotational axis of the diffusing non-imaging optic being parallel with the rotational axis of the collimating non-imaging optic.

13. A filtration system according to claim 12 wherein the diffusing non-imaging optic is the same shape and material as the collimating non-imaging optic.

14. A filtration system according to claim 13 wherein both the collimating non-imaging optic and the diffusing non-imaging optic are sections of cones.

15. A spectral filtration system, comprising:

a) a collimator having entry and exit faces;

b) a diffuser positioned to receive light from the exit face of the collimator; and c) a spectral filter positioned between the exit face of the collimator and diffuser;

wherein at least one of the collimator and diffuser is a non-imaging optic;

wherein the filtration system passes light in the wavelength ranges of 350–500 nm, 500–600 nm and 600–800 nm, with ratios of attenuations at the wavelength in each range which is least attenuated all being between 1/20 to 20/1 and wherein the non-imaging optic alters the degree of collimation of a light beam passing through it by at least one internal reflection.

16. A spectral filtration system according to claim 15 wherein the ratios of attenuations at the wavelength in each range which is least attenuated all being between 1/10 to 10/1.

17. A spectral filtration system according to claim 15 additionally comprising an electrically powered polychromatic light source positioned to provide light to the entry face of the collimator.

18. A scanner, comprising:

a) a light source;

b) a spectral filtration system having:

a collimator having entry and exit faces, to receive and collimate light from the light source;

a spectral filter positioned to receive light from the exit face of the collimator;

a diffuser positioned to receive light from the filter;

wherein at least one of the collimator and diffuser is a non-imaging optic with one face being tilted relative to the other;

c) a media holder to position an image bearing medium to be scanned so that the medium receives light from the diffuser; and d) a detector positioned to receive light from the medium being scanned and where in the non-imaging optic alters the degree of collimation of a light beam passing through it by at least one internal reflection.

19. A scanner according to claim 18 wherein the exit and entry faces of the collimator are planar.

20. A scanner according to claim 18 wherein the diffuser has a light entry face to receive light from the filter, and has a light exit face, and wherein the exit face is smaller in area than the entry face, and the diffuser entry and exit faces are both planar.

21. A scanner according to claim 19 wherein the collimator entry and exit faces are not parallel.

22. A scanner according to claim 18 wherein the collimator has the shape of a section of a rotationally symmetric form and the entry face is orthogonal to the rotational axis, the diffuser has the shape of a section of a rotationally symmetric form, and the rotational axis of the diffuser is parallel with the rotational axis of the collimator.

23. A scanner according to claim 22 wherein the diffuser is the same shape and material as the collimator, and both are sections of cones.

24. A scanner according to claim 18 wherein the light source and filtration system provide light to the media holder, which light in each of the wavelength ranges of 350–500 nm, 500–600 nm and 600–800 nm has an integrated power, measured in watts, such that all the ratios of the integrated powers are between 1/20 to 20/1.

25. An illumination system, comprising:

a) a light source;

b) a spectral filtration system having:

a collimator having entry and exit faces, to receive and collimate light from the light source;

a spectral filter positioned to receive light from the exit face of the collimator;

a diffuser positioned to receive light from the filter;

wherein at least one of the collimator and diffuser is a non-imaging optic;

wherein the light source and filtration system provide light from the diffuser, which light in each of the wavelength ranges of 350–500 nm, 500–600 nm and 600–800 nm has an integrated power, measured in watts, such that all the ratios of the integrated powers are between 1/20 and 20/1 and wherein the non-imaging optic alters the degree of collimation of a light beam passing through it by at least one internal reflection.

26. A scanner comprising:

a) a light source;

b) a spectral filtration system having:

a collimator having entry and exit faces, to receive and collimate light from the light source;

a spectral filter positioned to receive light from the exit face of the collimator;

a diffuser having an entry face positioned to receive light from the filter, and having an exit face;

wherein the diffuser entry face is not parallel to the diffuser exit face wherein at least one of the collimator and diffuser is a non-imaging optic and wherin the non-imaging optic alters the degree of collimation of a light beam passing through it by at least one internal reflection;

c) a media holder to position an image bearing medium to be scanned so that the image receives light from the diffuser; and d) a detector positioned to receive light from the medium being scanned.

27. A scanner according to claim 26 wherein the diffuser entry face is parallel to the collimator exit face.

* * * * *